Figure 1:
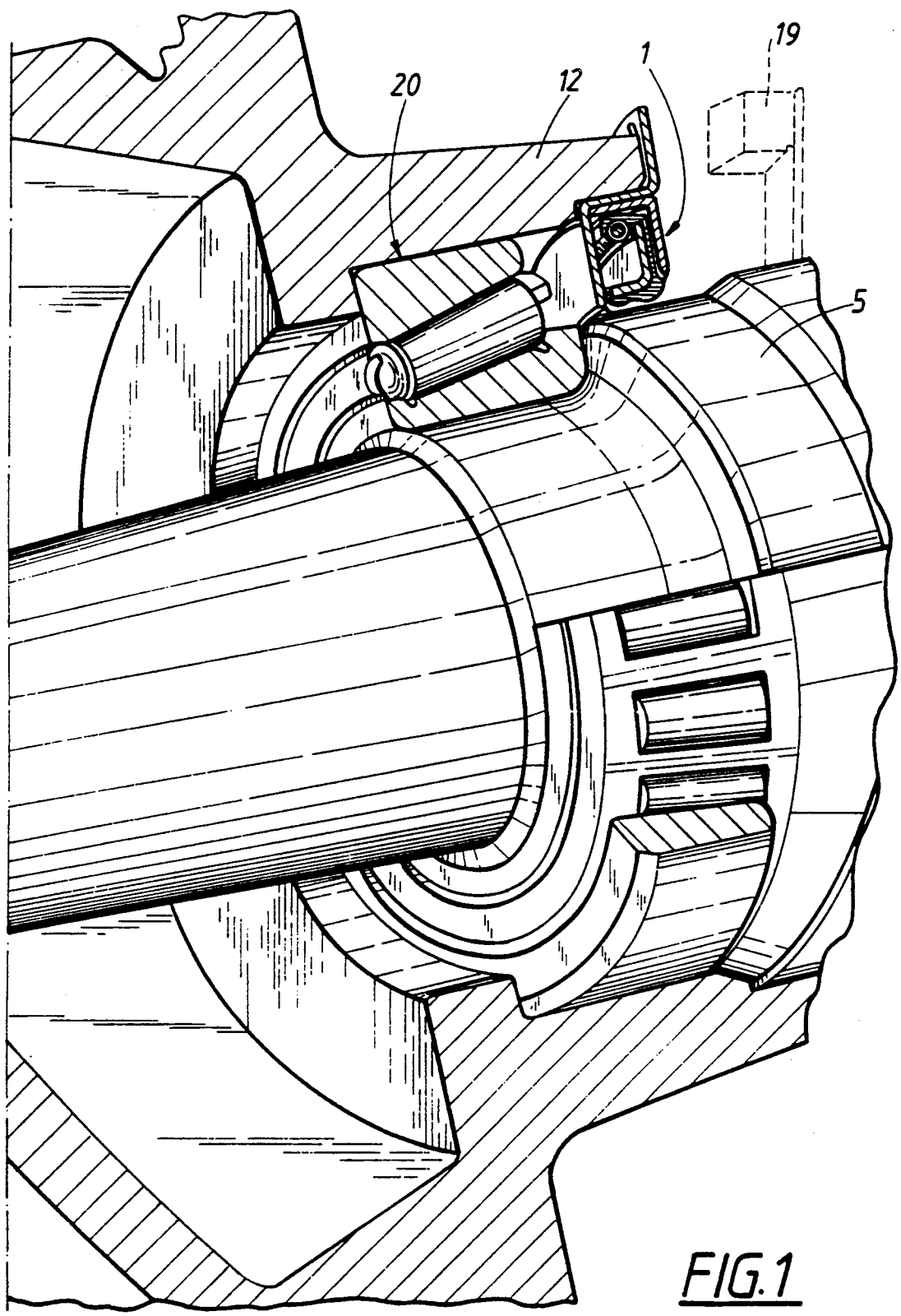

United States Patent [19]

Eskilsson

[11] Patent Number: 5,002,287

[45] Date of Patent: Mar. 26, 1991

[54] SEAL

[75] Inventor: Lars E. G. Eskilsson, Värnamo, Sweden

[73] Assignee: Forsheda AB, Sweden

[21] Appl. No.: 536,191

[22] Filed: Jun. 11, 1990

[30] Foreign Application Priority Data

Jun. 26, 1989 [EP] European Pat. Off. ........ 89850218.2

[51] Int. Cl.⁵ .............................................. F16C 33/78
[52] U.S. Cl. ....................................... 277/2; 384/448; 384/485
[58] Field of Search ............... 384/448, 446, 485, 147, 384/148; 277/2

[56] References Cited

U.S. PATENT DOCUMENTS

| 4,783,180 | 11/1988 | Hayashi | 384/448 |
| 4,850,722 | 7/1989 | Bayer | 384/448 |
| 4,884,901 | 12/1989 | Harsdorff | 384/448 |
| 4,948,277 | 8/1990 | Alff | 384/448 |

FOREIGN PATENT DOCUMENTS

| 0005707 | 11/1981 | European Pat. Off. |
| 1911513 | 12/1969 | Fed. Rep. of Germany |
| 3702474 | 8/1987 | Fed. Rep. of Germany |

Primary Examiner—Lenard A. Footland
Attorney, Agent, or Firm—Lerner, David, Littenberg, Krumholz & Mentlik

[57] ABSTRACT

The present invention relates to a seal (1) comprising a sealing means (2) and a casing means (3). The casing means (3) is arranged with a Z-shaped member (7, 10, 11), of which one portion (10) preferably is arranged with recesses (13) in order to provide for a rotational speed and measuring means.

4 Claims, 4 Drawing Sheets

SEAL

The present invention relates to a seal for bearings and especially such a seal including means which enable the measurement of the rotational velocity.

Prior art disclose a seal for bearings especially roller bearings, comprising a sealing means including a sealing element made of an elastomer and a casing means made of metal, said sealing means comprising a first sealing surface forming the annular surface of a hole, in which hole a shaft is intended to be positioned and thereby statically seal against said first sealing surface, which thereby is provided for acting as a carrier for the sealing means in relation to said shaft, and a second sealing surface having an outwardly directed sealing lip forming a part of said elastomer element, said casing means comprising a portion which at least substantially forms a cylindrical casing having an inwardly directed surface which is provided for dynamically sealing against said second sealing surface, and an outer casing surface which is provided for the insertion into a seating of a hub surrounding said shaft.

A seal of the above described kind is often used in machines where it is also desired to measure the rotational speed of the part which rotates by means of the bearing.

Normally when measuring the rotational speed of the device one has attached an appropriate means, e.g. a perforated disc, to the rotating part thereof. Furthermore, one has attached sensors to a stationary part of the machine. Thereafter it is possible, by means of the sensor, to sense and measure the rotational speed of the rotating disc, and therfore also the speed of the rotating part.

To make the measurement by means of such a disc reliable, it is necessary that this disc is produced in a qualified manner in order to fulfil the high demands concerning permissible variations. Furthermore, this disc has to be attached to the rotating part in a precise manner, in order to make its function reliable together with the sensor means. The latter demands concerning such a disc means, leads to a production and installation which are costly. Furthermore, there is always the risk that such a post attached device can loosen and fall off. To avoid the above disadvantages, at least partly, it has been suggested to use the casing of a seal, of the above mentioned kind, as the basement for attaching the disc. The seal having such a casing, made of metal, is shown in EP-B1-005707. Accordingly it has been suggested that the perforated disc, is pre-attached to the casing of the seal, i.e. before the sealing is fitted into a hub. To attach this disc one has used the fact that the casing is made of metal and the disc has been welded to this casing. Thereafter it is possible to fit the seal and the disc means at the same time.

Although the latter device involves an improvement in relation to prior art devices it also includes some disadvantages. Firstly, it involves the disadvantage that the production thereof has to be carried out including one further kind of production unit, i.e. welding, which make the production more complex and expensive. Secondly, the device is still not integral with anyone of the other parts and accordingly it therefore can loosen and fall off.

The object of the present invention is to remedy the above mentioned deficiency concerning known prior art.

This object is achieved by a seal of the above mentioned kind, wherein said casing characterised in that said casing has a main part of sheet metal with a radial cross section generally in the shape of a z, of which the intermediate portion forms said cylindrical casing; said intermediate portion at one of its ends has an inwardly directed portion in the shape of a disc, which inner diameter if larger than the diameter of said shaft; and that said intermediate portion at its other end is provided with a second disc which extends outwardly and is provided with a large number of recesses, preferably in the form of perforations, which between each other form teeth for the use as a rotating means in order to affect a sensor, e.g magnetically, as the casing rotates together with the hub.

Figure 2:
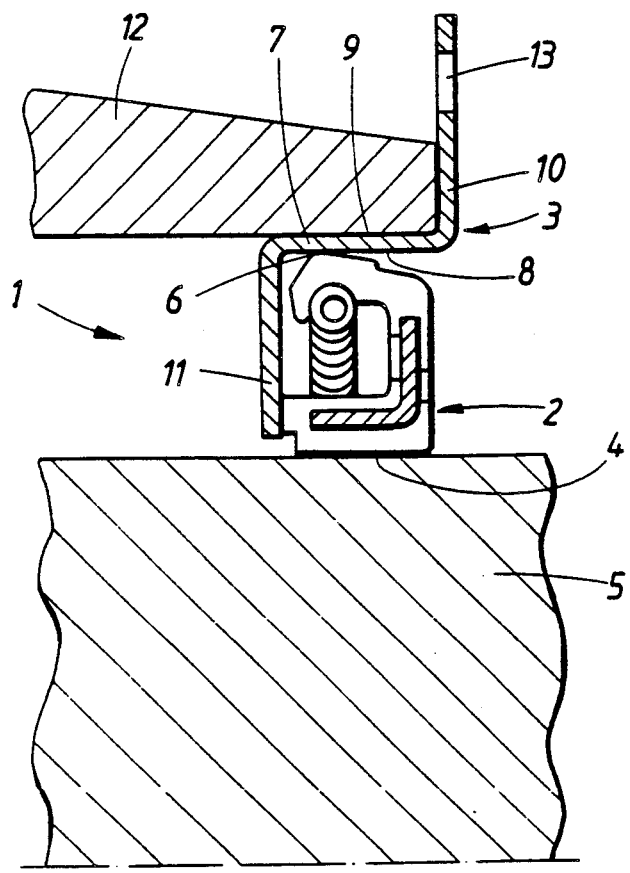
Figure 3:
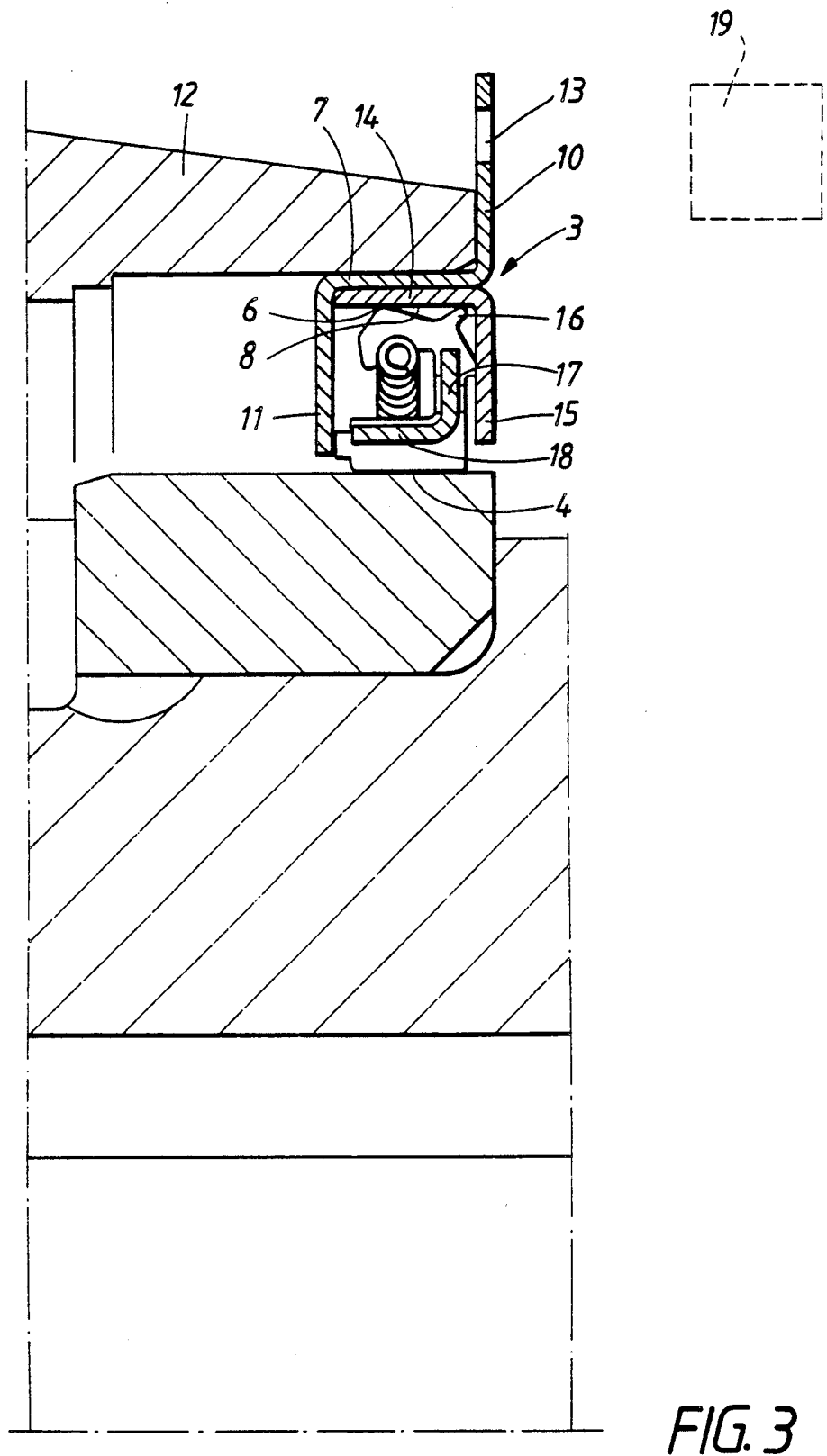
Figure 4:
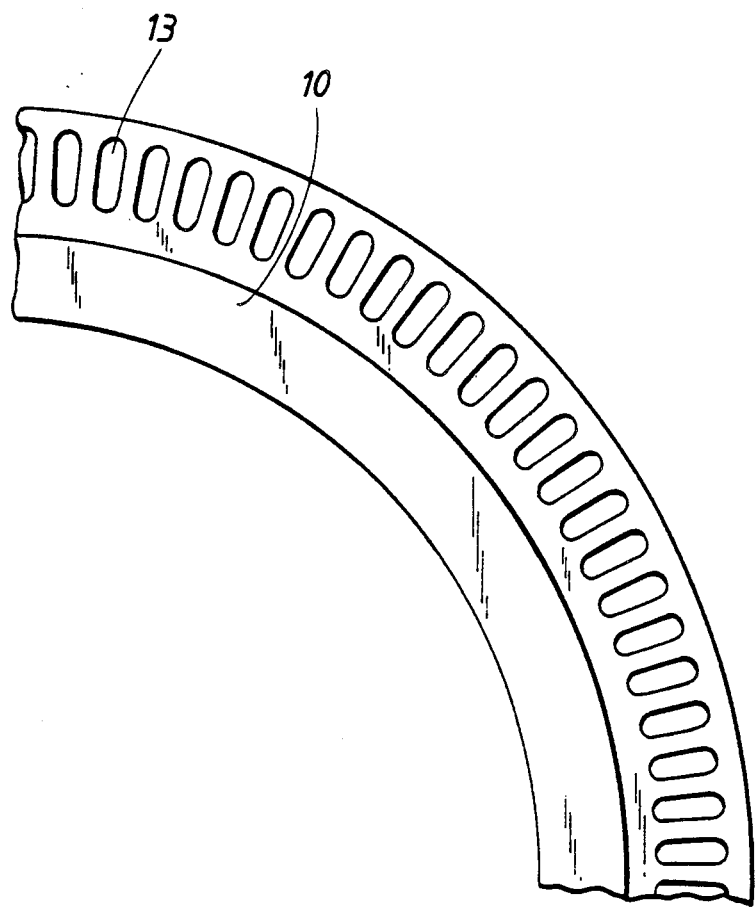

The invention will be described hereinafter with reference to the anexed drawings, in which :

FIG. 1 shows the principal arrangement of a seal in accordance with the invention, FIG. 2 shows a first mode of example of the invention, FIG. 3 shows a preferred mode of example of the invention, and, FIG. 4 shows a part of the outer portion of a casing means in accordance with the invention.

In FIG. 1 there is shown a principle arrangement of a seal 1 in accordance with the invention. The seal 1 is attached to a hub 12, which is rotatably arranged on a shaft 5 by means of a roller bearing 20.

In FIG. 2 there is shown a cross section of a seal 1 in accordance with the invention. The seal 1 is formed of two basic means, a sealing means 2 and a casing means 3. The sealing means 2 has two main functions. The first main function is to statically seal against the shaft 5. This first sealing function is achieved by an annular inwardly directed, first sealing surface 4. This part of the sealing hinders grease from the bearing 20 to escape between the inwardly facing surface 4 of the seal 2 and the shaft 5.

The second main function of the sealing means 2 is to hinder grease, or similar fluids, to escape between the hub 12 and the outwardly facing surface 6 of the sealing means 2. The second sealing surface 6 is achieved by a sealing lip 6 which dynamically seals against an inwardly directed surface 8 of the casing means 3.

The casing means 3 is made of an annular sheet metal part, which has a radial cross section generally in the shape of a Z. The intermediate portion 7 of the casing means 3 has an outwardly directed surface 9 which is to be fitted within the hub 12. The inwardly directed surface 8 of this intermediate portion 7 forms said sealing surface 8 of the casing 3. At one of its ends, the intermediate portion 7 has an inwardly directed portion 11 which inner diameter has to be larger than At the diameter of the shaft 5. At the other end of the intermediate portion 7 there is an outwardly extending portion 10 which is provided with a number of recesses 13.

When so the hub 12 is rotating the casing means 3 rotates together therewith and the sealing lip 6 of the sealing means 2 thereby dynamically seals against the inwardly directed surface 8 of the intermediate portion 7 of the casing means 3. Accordingly the sealing means 2 does not rotate and provides for the static seal at its innermost annular surface 4.

By means of the recesses 13, e.g. perforations, it is possible to measure the rotational speed of the hub 12. This is effected by positioning sensor means (not shown) to a stationary part of the machine, e.g. the shaft 5, in such a position that it can sense the rotational speed of the recesses. This can for example be achieved by using a magnetically sensing device which transmits a pulsation for each passing recess. By counting these pulsations, the distance between the recesses and make a time comparison it is possible to define the actual rotational speed.

As is evident of the above the production of such a seal is easily carried out by existing production units. When producing priorly known seals, it was always important that the outer diameter, which had to be fitted into a hub, was machined with low allowances. Since the same applies for the arrangement of the perforations 13 (the disc 10), i.e. low allowances, this is easily achieved in existing production units by forming said z-shaped casing means 3 having said perforations 13. Furthermore this can not loosen from the seal 1 since it forms an integral part thereof.

In FIG. 3 there is shown a preferred embodiment of a sealing means in accordance with the invention. Apart from the sealing function concerning liquids this seal also provides for sealing against dust. This sealing function concerning dust is achieved by arranging at least one more sealing lip 16 extending outwardly and which lip dynamically seals against said inwardly directed surface 8 of the casing 3. Furthermore it is shown that the sealing means 2 includes a L-shaped member 17, 18 which shall act as a supporting member for the elastomer portions of the sealing means 2. This, however, is optional.

The casing means 3 of the seal 1 in accordance with FIG. 3 is made of two members. Firstly it comprises a Z-shaped member 7, 11, 13 formed in the same way as the one shown in FIG. 2. Further it has a second casing member 14, 15 which is L-shaped. This L-shaped member has a cylindrical portion 14 of which the inwardly facing surface forms said sealing surface 8 of the casing 3. The second leg 15 of the L-shaped member is inwardly directed and forms an elongation of the outwardly extending disc 10 of the Z-shaped member.

When the hub 12 is rotating, both the metal sheet members (7, 10, 11; 14, 15) are rotated together therewith and as previously described the sealing means 2, remains stationary on the shaft against which it seals with its inwardly facing annular surface 4.

It is evident for the skilled man that certain modification of the above described mode of examples can be performed without departing from the scoop of the following claims. For example, it is not necessary that the casing is made of metal nor that it is provided with perforations. Any other material with appropriate properties could be used and instead of having perforations it is possible to include a material having significantly different properties. A plastic casing comprising metal parts positioned at certain places would for instance fulfil the same object. Furthermore it is possible to use a metallic member for the innermost sealing surface 4 of the sealing means 2, since this sealing function is static.

In the above the seal has been described for its use together with a shaft and a rotating hub together with a roller bearing. It is obvious however, that the sealing means could be used in anyplace where it is appropriate to measure the rotational speed of any means.

I claim:

1. A seal for bearings, comprising a sealing means (2) including a sealing element made of an elastomer and a casing means (3) made of metal, said sealing means comprising a first sealing surface (4) forming the annular surface of a hole, in which hole a shaft (5) is intended to be positioned and thereby statically seal against said first sealing surface (4), which thereby is provided for acting as a carrier for the sealing means (2) in relation to said shaft (5), and a second sealing surface having an outwardly directed sealing lip forming a part of said elastomer element, said casing means (3) comprising a portion (7) which at least substantially forms a cylindrical casing having an inwardly directed surface (8) which is provided for dynamically sealing against said second sealing surface (6), and an outer casing surface (9) which is provided for the insertion into a seating of a hub (12) surrounding said shaft (5), characterised in that said casing means (3) has a main part of sheet metal with a radial cross section generally in the shape of a Z, of which the intermediate portion (7) forms said cylindrical casing;

said intermediate portion (7) at one of its ends has an inwardly directed portion (11) in the shape of a disc, which inner diameter is larger that the diameter of said shaft (5);

and that said intermediate portion (7) at its other end is provided with a second disc (10) which extends outwardly and is provided with a large number of recesses (13) in the form of perforations, which between each other form teeth for the use as a rotating means in order to affect a sensor as the casing (3) rotates together with the hub (12).

2. A seal in accordance with claim 1, characterised in that the casing means (3), apart from said Z-shaped sheet metal member (7, 10, 11), comprises a second sheet metal member (14, 15) which cross section is L-shaped, having a first cylindrical part (14) of which the outer surface is positioned within said cylindrical part (7) of the first sheet metal member, whereas the inwardly facing surface of this second member (14, 15) forms said sealing surfact (8) of the casing, and a second disc like part (15), which is inwardly directed in relation to the cylindrical part (14), and which forms an inner extension of the second disc like part (10) of the first sheet metal member, whereby the sealing means (2) is incased within a U-shaped space, formed by the two members made of sheet metal.

3. A seal in accordance with claim 1 or 2, characterised in that said sealing means (2), apart from said elastomer, comprises an annulus made of a hard material, which radial cross section is L-shaped, having a generally cylindrically formed part (18), which is provided for supporting that part of the elastomer which carries the first sealing surface (4), and a disc like part (17) which extends radially outwardly together with the elastomer in a direction towards that part including said second sealing surface (6).

4. A seal in accordance with claim 3, characterised in that the second sealing surface (6), of the sealing means (1), is situated at that side of the Z-shaped casing which carries the inwardly extending disc like part (11), whereas at the other side of said casing there is arranged at least one further sealing surface (16), which is arranged on the sealing means (1) and which is provided for acting as an outer dust seal whereas said second sealing surface (6) is provided for acting as an inner liquid seal.

* * * * *